United States Patent
Sherman et al.

(10) Patent No.: US 6,564,635 B2
(45) Date of Patent: May 20, 2003

(54) BEARING ASSEMBLY WITH INTEGRAL SENSOR FOR SENSING ROTATION

(76) Inventors: Pete D. Sherman, P.O. Box 23548, Jacksonville, FL (US) 32241; Sarfraz K. Habibi, 979 Pine Way, Sanford, FL (US) 32773

(*) Notice: Subject to any disclaimer, the term of this patent is extended or adjusted under 35 U.S.C. 154(b) by 106 days.

(21) Appl. No.: 09/952,708

(22) Filed: Sep. 14, 2001

(65) Prior Publication Data

US 2003/0051549 A1 Mar. 20, 2003

(51) Int. Cl.$^7$ ................................................. G01P 1/02
(52) U.S. Cl. .................... 73/494; 73/514.39; 324/207.2; 324/207.25; 324/179
(58) Field of Search ...................... 73/488, 494, 514.39; 324/207.11–207.25, 419, 160–167, 173–180

(56) References Cited

U.S. PATENT DOCUMENTS

| | | |
|---|---|---|
| 4,002,937 A | 1/1977 | Anson |
| 4,167,734 A | 9/1979 | Logan et al. |
| 4,259,637 A | 3/1981 | Bloomfield et al. |
| 4,732,494 A | 3/1988 | Guers et al. |
| 4,864,231 A * | 9/1989 | Okumura et al. ........... 324/173 |
| 4,914,387 A | 4/1990 | Santos |
| 5,264,790 A * | 11/1993 | Moretti et al. .............. 324/174 |
| 5,372,435 A | 12/1994 | Genero et al. |
| 5,388,916 A | 2/1995 | Ohtsuki et al. |
| 5,428,289 A | 6/1995 | Sahashi et al. |
| 5,594,334 A | 1/1997 | Sonnerat et al. |
| 5,756,894 A * | 5/1998 | Paolo et al. .................. 73/489 |
| 6,007,250 A | 12/1999 | Brauer et al. |
| 6,082,195 A | 7/2000 | Wallingford |
| 6,111,401 A | 8/2000 | Mierzwinski |

\* cited by examiner

*Primary Examiner*—Richard A. Moller
(74) *Attorney, Agent, or Firm*—Thomas C. Saitta

(57) ABSTRACT

A bearing assembly tachometer device for attachment to a rotating shaft which comprises bearing target members disposed between a rotating inner ring member and a non-rotating outer ring to reduce friction therebetween, and a sensing device such as a Hall Effect sensor for detecting passage of the bearing target members as the inner ring member rotates, where the bearing target members are fixed in equidistant circumferential position about the inner ring member such that each said bearing target member rotates about the central axis of the inner ring member the same number of rotations as the inner ring member itself.

24 Claims, 4 Drawing Sheets

BEARING ASSEMBLY WITH INTEGRAL SENSOR FOR SENSING ROTATION

BACKGROUND OF THE INVENTION

This invention relates generally to the field of devices used to sense, monitor, count or measure rotation of a shaft, axle, tube or the like in order to determine the number of revolutions in total or over a given time period, with the resulting data being used to determine the speed of rotation, velocity or distance traveled of a vehicle, etc. Such devices are known in general as tachometers. More particularly, the invention relates to such devices which are attached directly onto the rotating member, and even more particularly, to such devices which incorporate a bearing assembly having a plural number of ball, roller or other type individual bearing members and which are integral units, such that the sensing means is integral with the bearing assembly structure.

It is often necessary or desirable to monitor the rotation of a shaft or axle, such as for example an axle or drive shaft on a vehicle, in order to determine data for calculating the revolutions per minute (rpm), speed, distance traveled, etc. Apparatuses for accomplishing this task are known generally as tachometers, which are taken herein to include more specialized apparatuses commonly referred to as speedometers or odometers when the calculations of speed and distance are based on measurement of the rotation or a shaft or axle. For example, from knowledge of the circumference measurement of a wheel coupled with the number of revolutions of the wheel axle or drive shaft, the distance traveled can be calculated, and this coupled with a time period produces a speed value.

In many instances, it is desirable to provide an auxiliary tachometer device for use with vehicles in addition to the factory installed equipment, such as for example where it is desired to be able to measure amount of travel of the vehicle more precisely over short distances. While the standard odometer provides broad information in terms of mile tenths, it is useful in many circumstances to be able to precisely determine distances in terms of yards or feet. In these circumstances, auxiliary tachometers which are able to provide data in smaller increments are attached to the vehicle. These may take the form of a small wheel attached externally to the vehicle frame or pulled as a trailer, or may comprise equipment which is connected to a rotating component of the vehicle which rotates in response to or causes rotation of the vehicle wheels. For example, it is known to provide auxiliary tachometers which measure rotation of the vehicle speedometer or tachometer cable, or the drive shaft or wheel axles, by attachment of a target device or pulser ring to the rotating vehicle member. Separate sensing devices are then used to measure the rotation of the target device or pulser ring to determine the number of rotations of the rotating component. Other known devices sense rotation of vehicle drive train components themselves without attachment of separate target members, such as by monitoring the rotation of the CV joint itself for example.

Examples of such tachometer devices include U.S. Pat. No. 4,002,937 to Anson, U.S. Pat. No. 4,167,734 to Logan et al., U.S. Pat. No. 4,259,637 to Blomfield et al., U.S. Pat. No. 4,732,494 to Guers et al., U.S. Pat. No. 4,914,387 to Santos, U.S. Pat. No. 5,372,435 to Genero et al., U.S. Pat. No. 5,388,916 to Ohtsuki et al., U.S. Pat. No. 5,428,289 to Sahashi et al., U.S. Pat. No. 5,594,334 to Sonnerat et al., U.S. Pat. No. 6,007,250 to Brauer et al., U.S. Pat. No. 6,082,195 to Wallingford, and U.S. Pat. No. 6,111,401 to Mierzwinski. The prior art illustrates that it is known to provide target devices or pulser rings which provide rotational information to a sensor means. In most instances, the sensor means is separated by an exposed gap from the target device, which is detrimental in outdoor or rough duty environments, since the accuracy of the device can be affected by misalignment or by the accumulation of dirt and debris. In other instances, target devices and sensor means are mounted within bearing assemblies such that the apparatus is an integral unit enclosed by a housing, where the rotation of the target devices are detected by the sensor means.

It is an object of this invention to provide a rotation measuring device which comprises or incorporates a bearing assembly, such that the sensor means and target devices are maintained within an integral unit, wherein the device is directly attached to encircle the rotating shaft or axle of a vehicle or other equipment, and wherein the bearings themselves are the actual targets sensed by the sensor means. It is a further object to provide such a device which is multi-sectional, such that the device can be connected to or removed from a shaft or axle without requiring the shaft or axle to have a free end over which the device may be slipped, thereby enabling the device to be attached and removed from the shaft or axle without requiring disassembly of the shaft or axle mounting structure.

SUMMARY OF THE INVENTION

In general, the invention device is a bearing assembly with integral sensing means which is attached directly to a rotating shaft, axle, tube or other such rotating member, such as for example the drive shaft or axle on a motor vehicle, or the shaft of a lathe or other piece of equipment, where the device senses and measures the rotation of the rotating member so that determination of desired data can be obtained, such as the total accrued number of revolutions, the number of revolutions per time period, the speed of rotation, the speed of a motor vehicle, the distance traveled by a motor vehicle, etc. The bearing assembly may incorporate ball, roller or other type bearing members.

The bearing assembly comprises an inner ring or race which is connected directly onto the rotating shaft member, and preferably comprises two semi-annular halves or greater than two partial arc segments joined to form a complete ring. A compressible mounting ring is preferably disposed between the inner ring and the rotating shaft member to insure that the inner ring is secured so that it will not rotate independently of the shaft member. The outer surface of the inner ring comprises bearing retaining means such as bearing seats or a cage structure to retain the bearing members in fixed, equally-spaced, circumferential positions about the inner ring, such that the bearings may rotate or revolve freely within the bearing retaining means but the relative positions of the bearings on the inner ring will not change. In this manner each bearing will make a complete 360 degree rotation relative to the central axis of the shaft member for each complete 360 degree rotation of the inner ring member and the rotating shaft member. The bearing assembly further comprises an outer ring or race which contains an interior track or channel to receive the bearing members. The outer ring is also preferably comprised of two semi-annular halves or greater than two partial arc segments joined to form a complete ring encircling the inner ring in a manner whereby the inner ring is free to rotate independently of the outer ring. The outer ring is fixed so as to be non-rotating, which may be accomplished by connecting the outer ring to a stationary component of the vehicle or piece of equipment to which the device is attached. The outer ring is most preferably provided with collar flanges or other housing means to enclose the bearing members and the inner race to prevent debris from contacting the bearings. Because the bearing assembly is sectional, it can be applied to a shaft or axle which does not have an exposed end.

Sensor means are provided in the outer ring itself, which sensor means may comprise a Hall Effect, optical or other type sensor. The sensor means detects each passage of a bearing member as the inner ring member and shaft member rotates, the bearing members themselves being the targets for the sensor means, which data is then interpreted or analyzed to determine the desired information for the equipment being monitored, such as rpm, speed, distance traveled, etc.

DETAILED DESCRIPTION OF THE INVENTION

Figure 1:
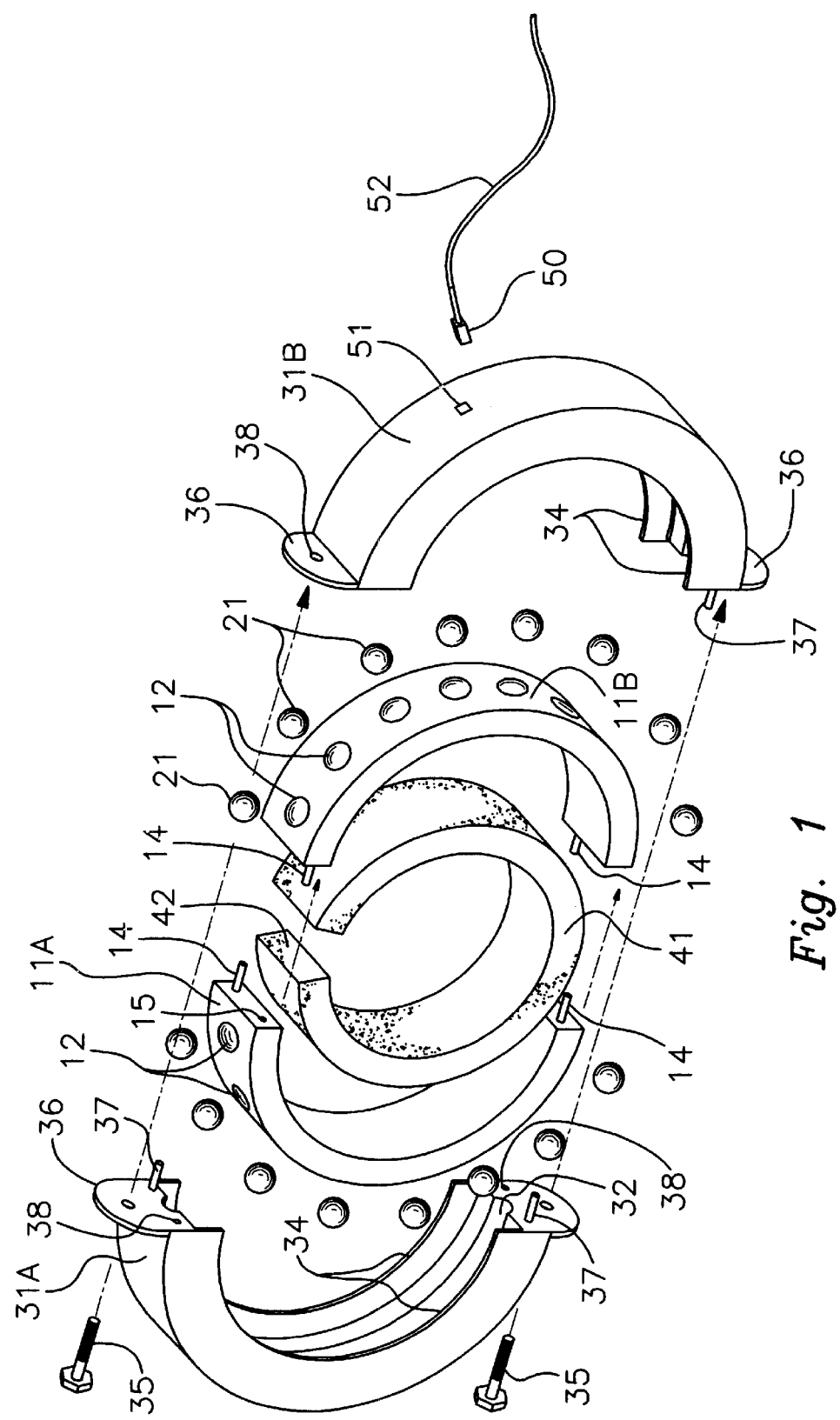
FIG. 1 is an exploded view of the invention.

With reference to the drawings, the invention will now be described in detail with regard for the best mode and the preferred embodiments. In general, the invention is a tachometer-type device comprising a bearing assembly with integral sensor means which is adapted to be attached directly to a rotating member, such as a shaft, axle, tube, etc., where the invention measures, monitors or senses the rotation of the rotating member, with this information being used to calculate or tabulate total number of rotations, speed of rotation, speed or distance covered for a vehicle, etc. In particular, the invention is such a device where the friction-reducing bearings themselves are the target members sensed by the sensor means, the bearings being maintained in a fixed, equidistant, circumferential relationship relative to the rotating member and to each other.

The invention comprises in general an inner ring or race member 11 adapted to be secured onto a rotating shaft member 91 so as to rotate in conjunction with the shaft member 91, a stationary or non-rotating outer ring, race or housing member 31, a plurality of bearing target members 21, and sensor means 50 mounted in or on the stationary outer ring member 31 which senses the passage of each bearing target member 21 as the inner ring member 11 rotates relative to the outer ring member 31. The rotating shaft member 91 may comprise any rotating member such as a shaft, axle, drive train, etc. on a vehicle, lathe or other type of equipment. The outer surface of rotating shaft member 91 is shown as circular in cross-section in the drawings, but the invention may be utilized with rotating members of different external configurations by adapting the manner in which the inner ring member 11 is attached to the rotating shaft member 91 as required.

The inner ring member 11 is preferably comprised of arc segments, most preferably a semi-annular first half 11a and a semi-annular second half 11b, where the halves 11a and 11b are provided with inner ring connector means 13 for securing the two halves 11a and 11b to each other to form the complete annular inner ring member 11. More than two such arc segments may also be utilized, and the halves 11a and 11b of inner ring member 11 may also be joined with a hinge member comprising the connector means 13. By segmenting the inner ring member 11, it is easy to attach the device to any rotating shaft member 91 by encircling rotating shaft member 91 and then connecting the inner ring halves 11a and 11b. In this manner it is not required to remove or disconnect the shaft member 91 in order to provide a free end over which to slide the inner ring member 11. Inner ring connector means 13 may comprise any suitable mechanical fasteners, such as for example corresponding pin members 14 and pin receiving apertures 15, which provide for proper alignment and secure connection of the inner ring halves 11a and 11b.

A mounting ring member 41 formed of a compressible material, such as a polymer foam or rubber, is preferably disposed internally to the inner ring member 11, such that it is positioned between the inner ring member 11 and the rotating shaft member 91. The mounting ring member 41, being flexible, may be provided with a single slit or slot 42 such that the mounting ring member 41 may be placed onto the shaft member 91 by spreading open slit 42 and placing the mounting ring member 41 about the shaft member 91. The thickness, configuration and density of the mounting ring member 41 may be varied depending on the outer diameter of the shaft member 91, thereby enabling the same inner ring member 11 to be securely mounted onto shaft members 91 of different outer diameters or configurations by substituting mounting ring members 41 of different dimensions and characteristics. With the inner ring member 11 disposed on the shaft member 91, the mounting ring member 41 is compressed, thereby insuring that the inner ring member 11 is affixed to the shaft member 91 in a secure manner such that the inner ring member 11 is rotated by the shaft member 91 with no slippage relative movement between the inner ring member 11 and the rotating shaft member 91.

Figure 2:
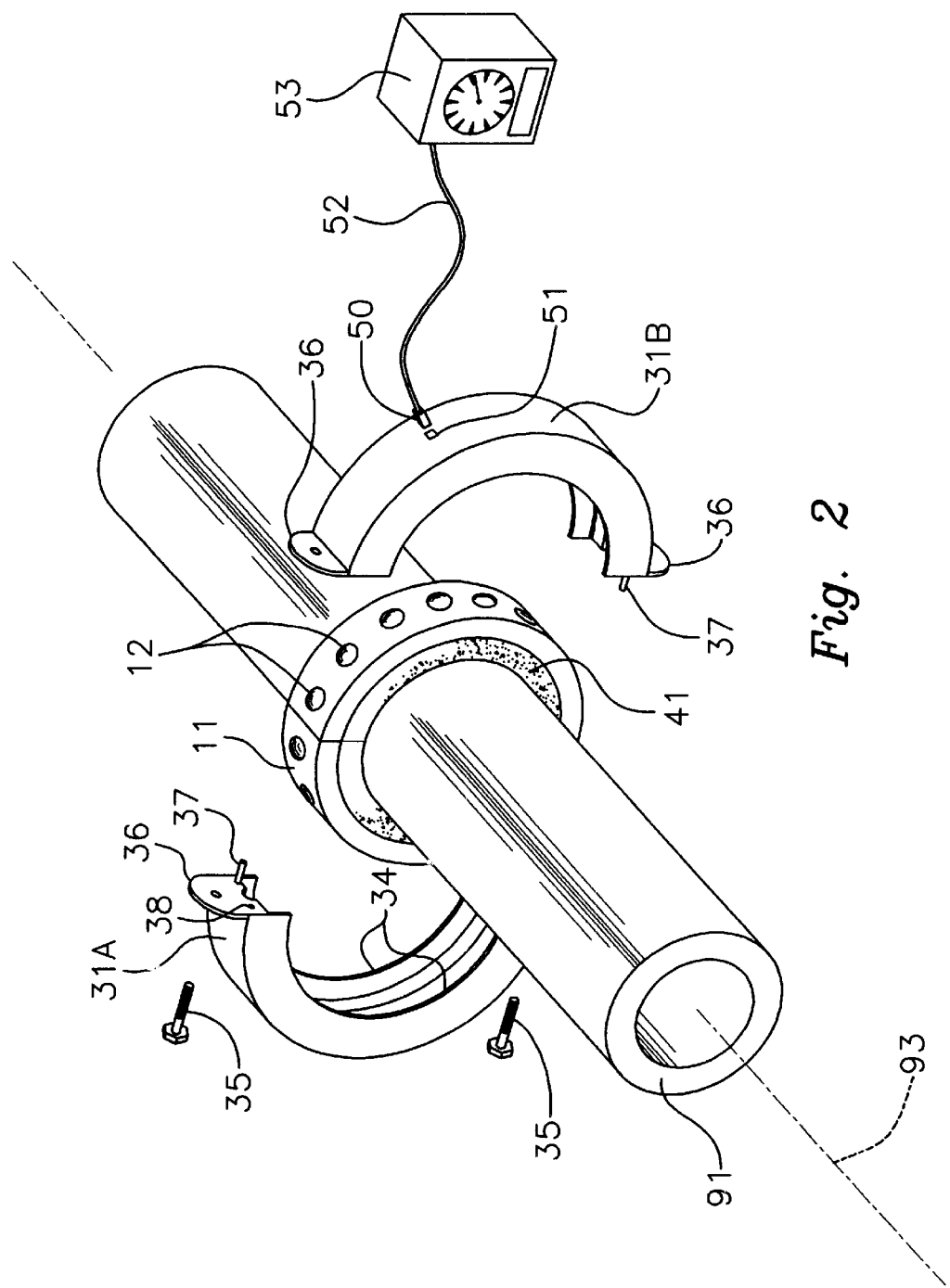
FIG. 2 is a partially exploded view showing the inner ring attached to the shaft member.
Figure 3:
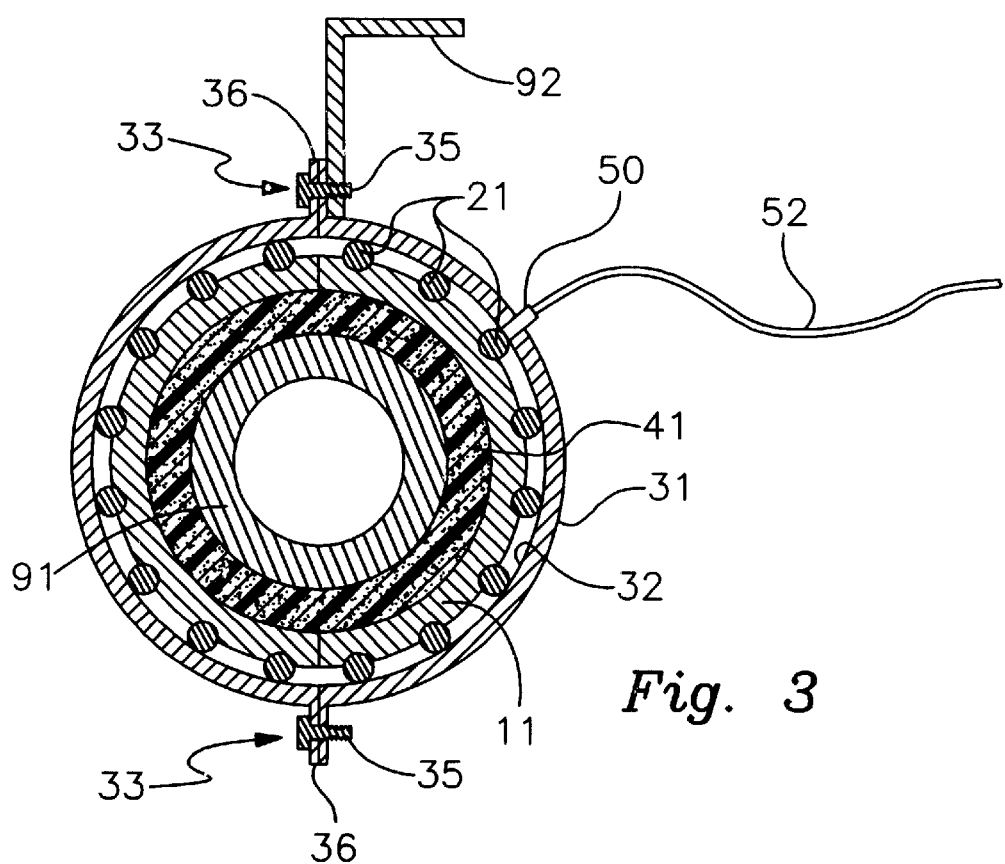
FIG. 3 is a transverse cross-sectional view of the invention mounted onto the shaft member.

Bearing retaining means 100 are provided to retain bearing target members 21 in a manner which allows for free revolving of the bearing target members 21 within the bearing retaining means 100 and to maintain bearing target members 21 in a fixed circumferential or annular relationship to the rotating inner ring 11, and thereby also in a fixed relationship to the rotating shaft member 91 to which the inner ring member 11 is attached. Bearing retaining means 100 preferably comprises a plural number of bearing seat members 12 which are positioned on the outer surface of the inner ring member 11. The bearing seat members 12 are equally spaced about the circumference of the inner ring member 11. The bearing target members 21 are free to rotate or revolve within the bearing seat members 12, but each of the bearing seat members 12 serves to retain a bearing target member 21 in a fixed circumferential or annular location relative to the inner ring member 11. The bearing target members 21 may be spherical, cylindrical, or of other known shape known in the bearing art. For ball bearing target members 21, the bearing seat members 12 will be generally hemispherical in configuration, while for roller bearing target members 21 the bearing seat members 12 will be generally semi-cylindrical in configuration. With this construction, as seen best in FIG. 2, the inner ring member 11 is co-axially aligned with the central axis 93 of the rotating shaft member 91 when properly mounted. A single rotation of the shaft member 91 results in a single rotation of the inner ring member 11. Therefore, each individual bearing seat member 12 and each bearing target member 21 will likewise make a single rotation in space about the central axis 93 for a single rotation of the shaft member 91. Each bearing target member 21 rotates an equal amount relative to the rotation of the central axis 93, i.e., each bearing target member 21 rotates the same number of degrees that the shaft member 91 rotates.

The non-rotating outer ring, race or housing member 31 is provided circumferentially about the inner ring member 11 and the bearing target members 21. Outer ring member 31 likewise preferably comprises two semi-annular halves 31a and 31b, or greater than two such arc segments, which are joined by outer ring connector means 33 to form the annular outer ring member 31, enabling the outer ring member 31 to be easily disposed about the shaft member 91 and the inner ring member 11. As shown in the drawings, the outer ring connector means 33 may comprise pin members 37 and pin receiving apertures 38 for alignment purposes, as well as apertured end flanges 36 and mechanical fasteners 35, which are shown as threaded bolts, for securing the two halves 31a and 31b. The interior surface of the outer ring member 31 is preferably provided with an annular bearing track or channel 32 to receive the bearing target members 21 in a manner which allows the inner ring member 11 to rotate within the outer ring member 31 with the bearing target members 21 traveling along the bearing track 32 to reduce friction, the outer ring member 31 being fixed in a stationary or non-rotating manner by bracket member 92 or other suitable means connected to a component of the equipment on which the device is being used. Preferably, the outer ring member 31 is provided with collar flange members 34 which extend toward the central axis 93 and are disposed just to either side of the inner ring member 11 to form a housing. The collar flange members 34 act as a barrier in the nature of a sealed bearing assembly to prevent dust, dirt and other debris from contacting the bearing target members 21.

The outer ring member 31 is provided with a sensor mounting port 51, such that a sensor means 50 may be positioned within the outer ring member 31 at a location where the sensor means is capable of sensing the passage of the bearing target members 21 within the bearing track 32 past the sensor means 50. The sensor means 50 may be any type sensor device capable of performing this function, but preferably comprises a Hall Effect sensor. Hall Effect sensors are well known in the art, and comprise devices which detect field changes in a magnetic field as a metal object passes through the field, in this case the metal bearing target members 21. Alternatively, optical sensing devices or even mechanical devices such as a reed switch could be utilized to sense the passage of each of the bearing target members 21 past the sensor means 50. The sensor means 50 is provided with communicating means 52, such as conductive wires, infrared transmitters, radio transmitters or the like, to a sensor analysis means 53, which utilizes known methods to translate the rotation data received from the sensor means 50 into desirable output data on shaft revolutions, speed, distance traveled, etc.

Figure 5:
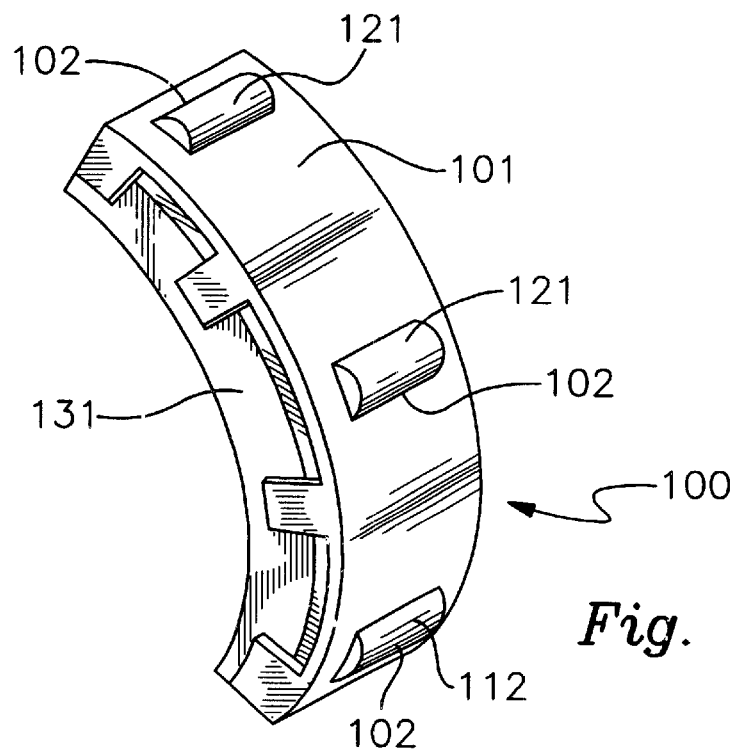
FIG. 5 is a view of an inner ring segment of an alternative embodiment of the invention showing cylindrical bearings retained by a cage member.
Figure 4:
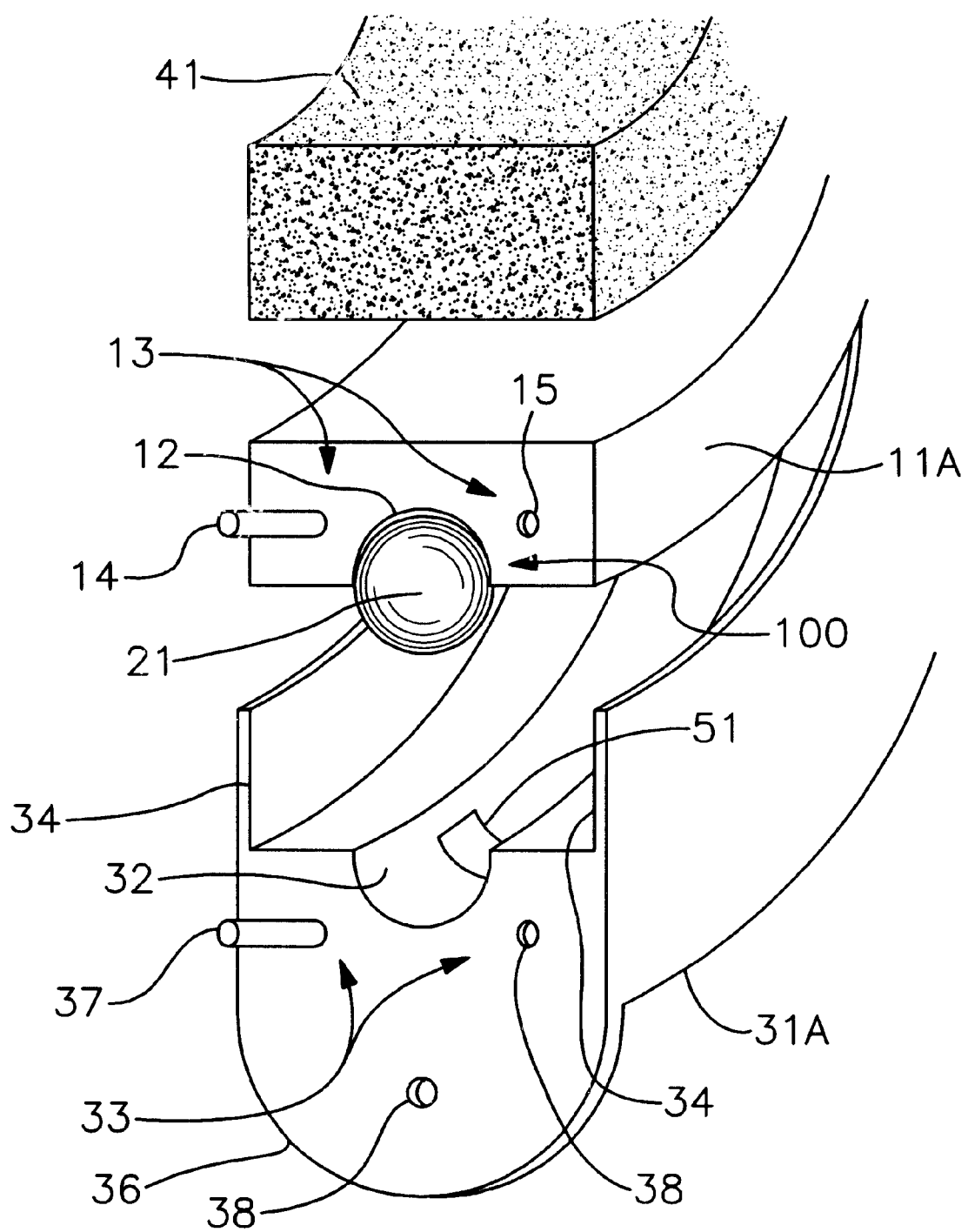
FIG. 4 is a partial, exploded end view showing an outer ring half, an inner half and the mounting ring.

An alternative embodiment for the device is shown in FIG. 5. In this embodiment, inner ring member 131 has a smooth outer surface or is provided with a bearing track or channel, and the bearing target members 121, shown here as cylindrical or roller bearings, are fixed in position circumferentially relative to the inner ring member 131 by bearing retaining means 100 comprising a cage member 101 which is attached to the inner ring member 131 in suitable fashion, such as by welding, mechanical fasteners, mechanical interlocks, etc., so that there is no relative motion between the cage member 101 and the inner ring member 131. As before, each bearing target member 121 will rotate about the central axis of the inner ring member 131 as the rotating shaft to which the inner ring member 131 is attached rotates, one full revolution for each single revolution of the shaft. The cage member 101 allows the individual bearing target members 121 to revolve freely within cage apertures 102 such that the inner ring member 131 can freely rotate relative to the stationary outer ring member. The cage apertures 102 and the bearing target members 121 are spaced equidistantly about the inner ring member 131.

With the device properly mounted onto a rotating shaft member 91, the inner ring member 11 and bearing target members 21 rotate at the same rate as the shaft member 91, due to bearing retaining means 100. The sensor means 50 mounted in the fixed outer ring member 31 senses each passage of bearing target members 21 past the sensor means 50. This data is then relayed to the sensor analysis means 53, where it may be translated, recorded, displayed, etc. As the shaft member 91 rotates faster, a larger number of bearing target members 21 pass the sensor means 50 within a given time period, and as the shaft member 91 rotates slower, fewer bearing target members 21 pass the sensor means 50. The total number of bearing target members 21 passing the sensor means 50 can be used to determine the total number of rotations or the rpm's of the rotating shaft member 91, which can be translated in very accurate manner into distance traveled or speed for a vehicle, for example. Because each bearing target member 21 is separated by a relatively small distance, typically on the magnitude of inches, shaft 91 rotations can be measured down to fractions of rotations, thus providing very accurate data relative to the number of shaft 91 rotations, distance traveled by a vehicle, speed, etc.

It is understood that equivalents and substitutions for certain elements set forth above may be obvious to those skilled in the art, and thus the true scope and definition of the invention is to be as set forth in the following claims.

We claim:

1. A device for measuring rotation of a shaft or similar rotating member having a central axis, said device comprising a bearing assembly comprising:

a rotating inner ring member adapted to be attached in fixed manner to a rotating member such that said rotating inner ring member rotates equally with such rotating member about such central axis;

bearing target members disposed in equidistant manner circumferentially about said inner ring member;

a fixed, non-rotating outer ring member surrounding said inner ring member and said target bearing members, whereby said bearing target members reduce friction between said rotating inner ring member and said non-rotating outer ring member;

bearing retaining means for retaining said bearing target members in fixed circumferential position relative to said inner ring member, whereby each said bearing target member rotates equally with said rotating inner ring member about such central axis; and sensor means for sensing the passage of each said bearing target member past said sensing means.

2. The device of claim 1, wherein said sensor means is disposed in said outer ring member.

3. The device of claim 1, wherein said inner ring member and said outer ring member comprise individual arc segments which are joined about such rotating member.

4. The device of claim 3, further comprising inner ring connector means for joining said individual segments of said inner ring member and outer ring connector means for joining said individual segments of said outer ring member.

5. The device of claim 1, wherein said outer ring member further comprises a collar flange encasing said inner ring member.

6. The device of claim 1, wherein said bearing retaining means comprises bearing seat members disposed on said inner ring member, each said bearing target member being received by a bearing seat member wherein each said bearing target member is free to revolve within said bearing seat member.

7. The device of claim 1, wherein said bearing retaining means comprises a cage member joined to said inner ring member, said cage member comprising cage apertures, wherein each said bearing target member is received by a cage aperture wherein each said bearing target member is free to revolve within said cage aperture.

8. The device of claim 1, where said sensor means is a sensor means chosen from the group of sensor means consisting of Hall Effect sensors, optical sensors and mechanical sensors.

9. The device of claim 1, further comprising a compressible mounting ring disposed internally to said inner ring member such that it is positioned between said inner ring member and such rotating member.

10. A tachometer device comprising:
   an inner ring member adapted for attachment to a rotating member having a central axis such that said inner ring member rotates with such rotating member;
   a non-rotating outer ring member adjacent said inner ring member;
   a plurality of bearing target members disposed between said inner ring member and said outer ring member, said bearing target members acting to reduce friction between said inner ring member and said outer ring member, said bearing target members being equidistantly spaced about said inner ring member;
   bearing retaining means for retaining said bearing target members in fixed circumferential position relative to said inner ring member, such that said bearing target members rotate equally with said inner ring member about such central axis; and
   sensor means mounted on said outer ring member for detecting rotation of said bearing target members about such central axis.

11. The device of claim 10, wherein said inner ring member and said outer ring member comprise individual arc segments which are joined around such rotating member.

12. The device of claim 11, further comprising inner ring connector means for joining said individual arc segments of said inner ring member and outer ring connector means for joining said individual arc segments of said outer ring member.

13. The device of claim 10, wherein said outer ring member further comprises a collar flange encasing said inner ring member.

14. The device of claim 10, wherein said bearing retaining means comprises bearing seat members disposed on said inner ring member, each said bearing target member being received by one of said bearing seat members wherein each said bearing target member is free to revolve within said bearing seat member.

15. The device of claim 10, wherein said bearing retaining means comprises a cage member joined to said inner ring member, said cage member comprising cage apertures, wherein each said bearing target member is received by a cage aperture wherein each said bearing target member is free to revolve within said cage aperture.

16. The device of claim 10, where said sensor means is a sensor means chosen from the group of sensor means consisting of Hall Effect sensors, optical sensors and mechanical sensors.

17. The device of claim 10, further comprising a compressible mounting ring disposed internally to said inner ring member such that said mounting ring is positioned between said inner ring member and such rotating member.

18. A bearing assembly adapted for connection to a rotating member, said bearing assembly comprising:
   a rotating inner ring member and a non-rotating outer ring member;
   bearing target members disposed between said inner ring member and said outer ring member, said bearing target members between equally spaced circumferentially about said inner ring member, said bearing target members reducing friction between said inner ring member and said outer ring member;
   bearing retaining means retaining said bearing target members in fixed circumferential position relative to said inner ring member; and
   sensor means disposed in said outer ring member for sensing said bearing target members as said inner ring member rotates.

19. The assembly of claim 18, wherein said inner ring member is comprised of individual arc segments joined to form a complete inner ring member and said outer ring member is comprised of individual arc segments joined to form a complete outer ring member.

20. The assembly of claim 19, further comprising connector means for joining said individual inner ring arc segments and for joining said individual outer ring arc segments.

21. The assembly of claim 18, wherein said bearing retaining means comprises a plurality of bearing seat members disposed on said inner ring member, each said bearing target member being received by one of said bearing seat members such that each said bearing target member is free to revolve within said bearing seat member.

22. The assembly of claim 18, wherein said bearing retaining means comprises a cage member connected to said inner ring member and having a plurality of cage apertures, each said bearing target member being received by one of said cage apertures such that each said bearing target member is free to revolve within said cage aperture.

23. The device of claim 18, where said sensor means is a sensor means chosen from the group of sensor means consisting of Hall Effect sensors, optical sensors and mechanical sensors.

24. The device of claim 18, further comprising a compressible mounting ring disposed internally to said inner ring member.

* * * * *